US012775067B2

(12) United States Patent
Hamza et al.

(10) Patent No.: US 12,775,067 B2
(45) Date of Patent: Oct. 27, 2026

(54) HYBRID SPARSE SUBARRAY DESIGN FOR FOUR-DIMENSIONAL IMAGING RADAR

(71) Applicant: BDCM A2 LLC, Dover, DE (US)

(72) Inventors: Syed Ali Hamza, Villanova, PA (US); Kenneth Ray Carroll, Huntington Beach, CA (US)

(73) Assignee: BDCM A2 LLC, Dover, DE (US)

( * ) Notice: Subject to any disclaimer, the term of this patent is extended or adjusted under 35 U.S.C. 154(b) by 578 days.

(21) Appl. No.: 17/738,784

(22) Filed: May 6, 2022

(65) Prior Publication Data

US 2022/0373643 A1 Nov. 24, 2022

Related U.S. Application Data

(60) Provisional application No. 63/185,287, filed on May 6, 2021.

(51) Int. Cl.
*G01S 7/40* (2006.01)
*G01S 13/931* (2020.01)

(52) U.S. Cl.
CPC .............. *G01S 7/40* (2013.01); *G01S 7/4021* (2013.01); *G01S 13/931* (2013.01)

(58) Field of Classification Search
CPC ......... G01S 7/40; G01S 7/4021; G01S 13/931
See application file for complete search history.

(56) References Cited

U.S. PATENT DOCUMENTS

2021/0116531 A1* 4/2021 Shabtay .............. G06F 18/2431
2022/0120847 A1* 4/2022 Zhang ..................... G01S 7/032
2022/0260708 A1* 8/2022 Li ......................... G01S 13/931

FOREIGN PATENT DOCUMENTS

CN 111352078 A * 6/2020

OTHER PUBLICATIONS

Lin, Zhipeng, et al. "Nested hybrid cylindrical array design and DoA estimation for massive IoT networks." IEEE Journal on Selected Areas in Communications 39.4 (2020): 919-933. (Year: 2020).*

(Continued)

*Primary Examiner* — Nazra Nur Waheed
(74) *Attorney, Agent, or Firm* — Dinsmore & Shohl LLP

(57) ABSTRACT

Two-dimensional DOA estimation is challenging as the computational and hardware complexity could scale as the square as compared to that of one-dimensional problem. The proposed scheme relies on designing antenna locations and also involves a mix of subarray and digital beamforming to lower the overall system performance and cost by reducing the costly transceiver chains.
This framework proposes a two-step solution which first isolates a target to a given range doppler bin and elevation angle by linear receive subarray in the elevation direction. However, the elevation estimate is relatively coarse which is further refined along with a high-resolution estimate of azimuth angle. This is achieved by processing the received data from a 2D sparse antenna array, which are systematically chosen to maximize the resolution in both directions. The compressive sensing algorithm is applied to the 2D sparse received array data which exploits the sparse representation of the underlying signal support. The propose approach successfully pairs the correct elevation and azimuth angles for multiple targets. The methodology is effective for a case of single data snapshot and algorithm performance scale well with the availability of multiple data snapshots. It is noted that the proposed methodology allows to further increase the system resolution when data is processed with MIMO virtual array processing.

1 Claim, 14 Drawing Sheets

(56) References Cited

OTHER PUBLICATIONS

Yu, Yingrui, et al. "A hybrid radar system with a phased transmitting array and a digital beamforming receiving array." IEEE Transactions on Antennas and Propagation 69.4 (2020): 1970-1981. (Year: 2020).*

* cited by examiner

1102

1100

HYBRID SPARSE SUBARRAY DESIGN FOR FOUR-DIMENSIONAL IMAGING RADAR

CROSS-REFERENCE TO RELATED APPLICATIONS

This application claims priority to Provisional Application No. 63/185,287, entitled "Hybrid Sparse Subarray Design For Four-Dimensional Imaging Radar," May 6, 2021, and incorporated herein by reference in its entirety.

BACKGROUND

Radar systems for automotive system capture large amounts of data and process to provide real time instructions. As these systems move from automated driver assistance systems (ADAS) to fully autonomous operation the amounts of data and processing burden will continue to increase.

BRIEF DESCRIPTION OF THE DRAWINGS

The present application may be more fully appreciated in connection with the following detailed description taken in conjunction with the accompanying drawings, which are not drawn to scale and in which like reference characters refer to like parts throughout, and wherein.

DETAILED DESCRIPTION

The present invention provides methods and apparatuses for fast object detection and understanding that allows for real time decision-making. The radar system receives data at a receive antenna made of arrays of radiating elements. These signals interact with targets, or objects in the area covered by the radar unit, and return to the radar unit with a time delay compared to the transmitted signal. The target parameters, such as range, may be measured by a change in frequency at the receiver, wherein this change in frequency is referred to as a beat frequency. Increasing the number of radiating elements to receive the radar echo signals improves angular resolution and identification of targets and correspondingly the amount of data to process. By implementing sparse array techniques, the present inventions create an extended aperture antennas to enhance 2D direction of arrival performance and other receive signal processing.

Figure 1:
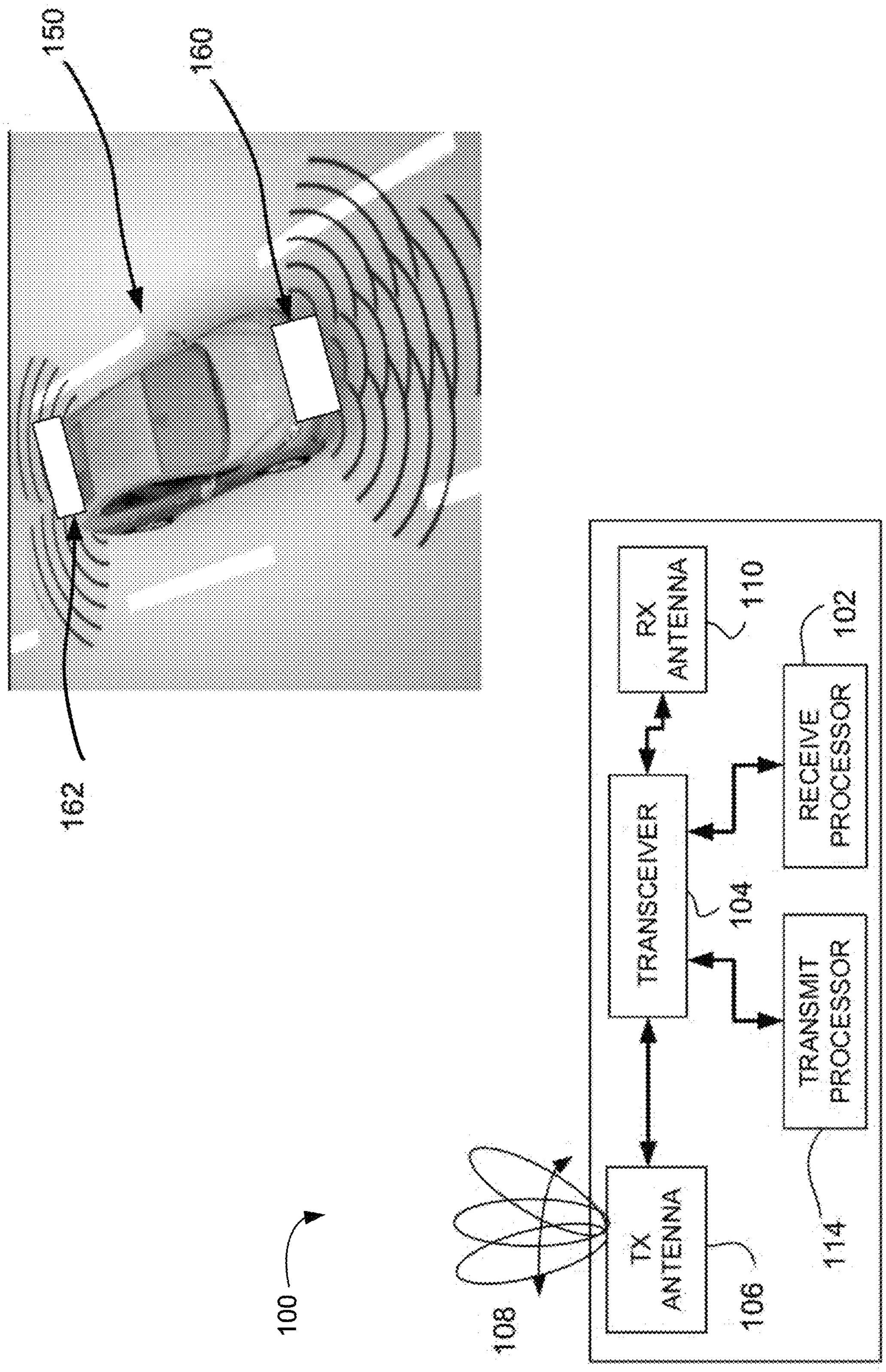
FIG. 1 illustrates a radar system, according to example embodiments of the present inventions.

FIG. 1 illustrates a radar system 100 for a vehicle 150 with radar units 160, 162. The radar units are provided on various locations of a vehicle to interpret and understand the vehicle's environment and avoid target objects that may interfere with the safe movement of the vehicle. In this example, radar unit 160 is located in the front of the vehicle 150 and radar unit 162 is located at the rear of the vehicle. The radar unit 100 includes a transmit antenna 106, a receive antenna 110, coupled to transceiver 104. Transmission signals are processed in transmit processor 114. Receive signals are processed in receive processor 102. The transmit antenna 106 is a beamforming antenna that scans a beam 108 in azimuth and in some embodiments elevation.

Figure 2:
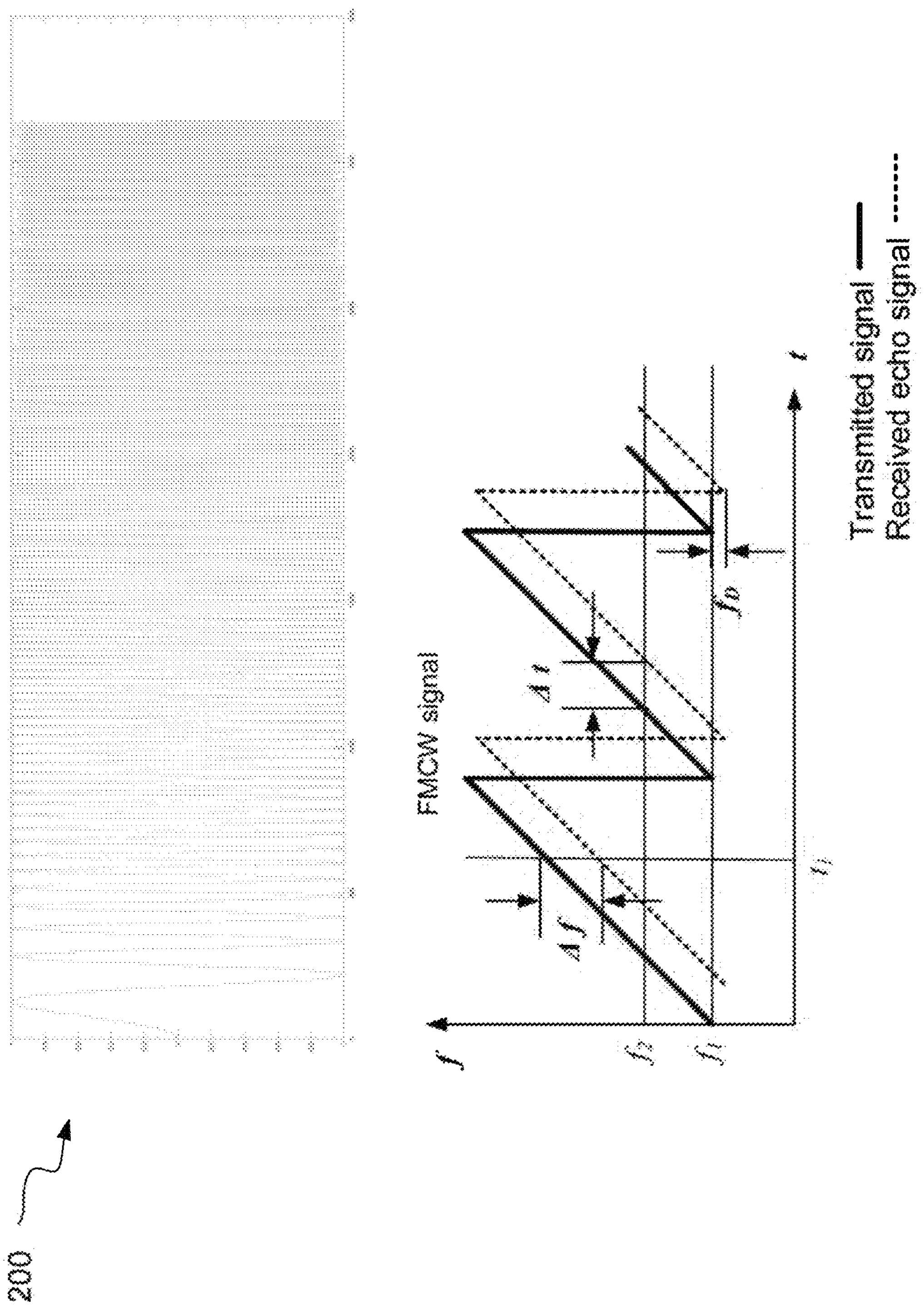
FIG. 2 illustrates frequency modulated continuous wave radar signals as used in radar systems according to example embodiments of the present inventions.

The transmission signal is a frequency modulated continuous wave (FMCW) signal, as illustrated in FIG. 2, and the radar unit radiates continuous transmission power changing its operating frequency during the measurement, transmit and receive. The signals are reflected and the echo is received at the radar unit where the transmit antenna and receive antennas are synchronized. The received echo signal has a slightly different frequency compared to the signal transmitted at that moment, wherein the frequency difference is directly proportional to the echo delay. The change in frequency provides a time delay, $\Delta t$, for the signal round trip or twice the range to the target, and the change in frequency is also used determine the velocity from the Doppler shift. All of these calculations are part of the data processing burden of the system.

Some of the processing measurements are described in this section. There are a variety of applications for radar, such as automotive, healthcare, industrial and so forth. FMCW modulation is a good choice for radar, enabling accurate measurement of very small ranges, or distance to the target; the minimal measured range is related to the transmitted wavelength. FMCW radar is used for driver assist systems, sensors and self-driving vehicle capabilities as these applications have strict requirements in different environments and all-weather conditions. In FMCW radar, the transmit signal is generated by frequency modulating a continuous wave signal. In one sweep of the radar operation, the frequency of the transmit signal varies linearly with time. This kind of signal is also known as the chirp signal. The transmit signal sweep a frequency, f, in one chirp duration. Due to the propagation delay, the received signal reflected from a target has a frequency difference, called the beat frequency, compared to the transmit signal. The range of the target is proportional to the beat frequency. Thus, by measuring the beat frequency, the target range is obtained.

FMCW radar accomplishes distance measurements by comparing the frequency of the received echo signal to a reference signal, which in this system is the transmit signal. The range, R, to the reflecting object is given as:

$$R = \frac{c_0|\Delta t|}{2} = \frac{c_0|\Delta f|}{2\left(\frac{d(f)}{d(t)}\right.}$$

where $c_0$ is speed of light, Δt is delay time, Δf is measured frequency difference, $$\frac{df}{dt}$$

is the frequency shift per unit time.

For frequency change is linear, the radar range is determined by frequency comparison. The frequency difference, Δf is proportional to the range, R. When the reflecting object has a radial speed with respect to the receiving antenna, then the echo signal incurs a Doppler frequency $f_D$ due to speed. The radar measures not only the difference frequency, Δf, to the current frequency, but a Doppler frequency $f_D$. The period of the FMCW signal is referred to as the chirp.

In a radar system signal information is provided to the transmit antenna to steer a radiation beam to cover a Field of View (FoV). The beam radiates through the FoV and returns when it encounters an object or target. As illustrated at time $t_1$, the difference in frequency between the transmitted signal and the received echo or return signal is represented as Δf. The Doppler frequency, $f_D$ is illustrated at time frequency $f_1$. The delay, or Δt, is illustrated as the difference in time from transmitted signal to received signal.

In the present radar example, a chirp generator provides chirp signals and waveforms which are modulated onto a 77 GHz carrier. Two distinct instances may be used for the transmitter and receiver such that different parameters may be selected.

Figure 3:
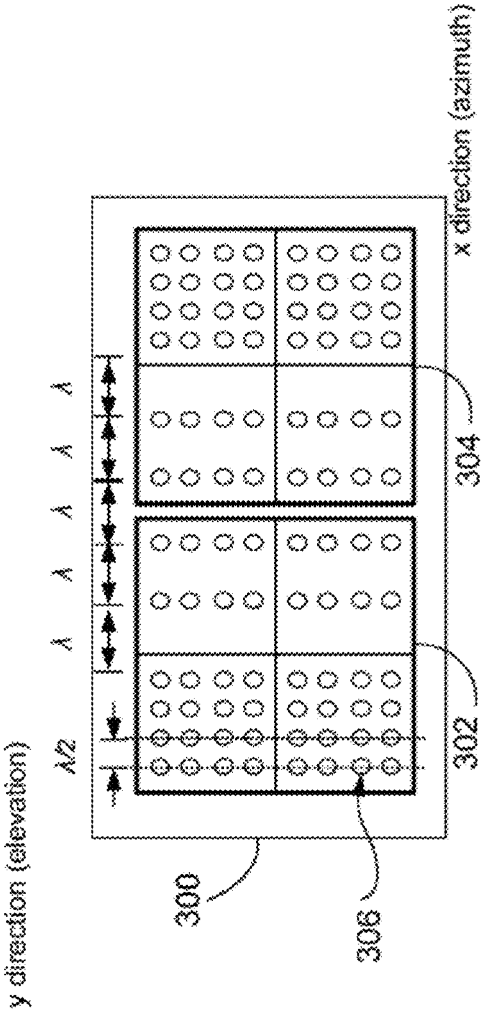
FIG. 3 illustrates a tile sparse receive antenna in a radar system, according to example embodiments of the present inventions.

Returning to the receive processing, FIG. 3 illustrates a receive antenna 300 having multiple arrays. The arrays are organized into tiles 302, 304. Each of the tiles having a plurality of receiving elements 306. Within each tile the receiving elements are arranged and separated by λ/2 and integer multiples of λ/2. The separation from one tile to another is also λ/2. Each tile, such as 302, includes an array of receiving elements, as 306. The minimum tile separation is calculated so as to avoid spatial aliasing corresponding to the highest possible spatial frequency from the source at array end-fire. The received data is processed such that analogue beamsteering is implemented in the elevation DOA while the received data is collected for processing azimuth DOA for a given elevation direction. This enables 2D direction of arrival estimation, where the received data is collected across the azimuth axis while the elevation subarray steering is implemented using phase shifters. The configuration 300 is an example detailed throughout this specification for clarity of understanding; however, there are a variety of configurations that may be implemented. To determine the location of a target, a radar unit uses parameters of the receive signal to determine the direction of arrival (DOA), and so forth, of incoming signals.

Figure 4:
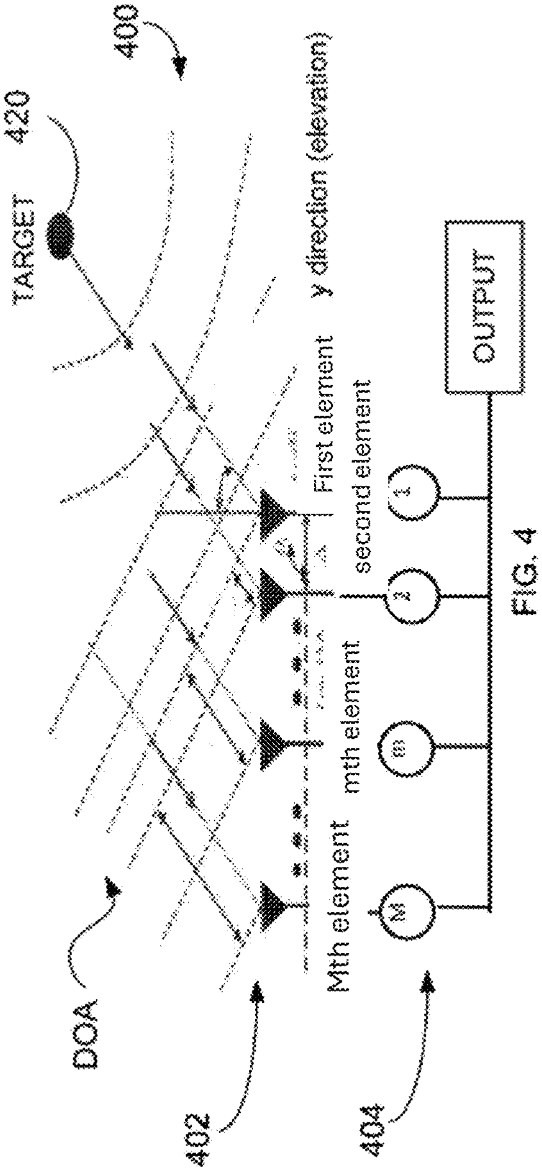
FIG. 4 illustrates a receiver portion of a radar system, according to example embodiments of the present inventions.

In FIG. 4 a radar module 400 includes a receive antenna having receiving elements 402 to receive electromagnetic waves. The elements 402 are coupled to phase shifters 404 to beam steer the receive antenna to capture signals in coordination with those transmitted by the radar unit 400. When a target is in the vicinity at a range, R, from the radar unit 400, transmitted signal (not shown) are reflected off the target 420. The receive antenna process the data from a target 420 as received at the receive antenna array 400 in received at multiple receiving elements 402. Each receiving element 402 is coupled to a controller 404, such as a phase controller, and then combined at the output. The FMCW signal received is compared to the transmit signal to determine a range to the target 420 off which a transmit signal reflects toward the receive antenna elements 402. The elevation DOA is determined by the received signal and the beam steered elements 402. The receive signal is then provided as analog output to the radar unit 400 for further processing. The received signal is compared to the transmit signal to determine range, Doppler shift, and so forth. To determine precise 2D location of the target the radar unit 400 first isolates the target in the range, doppler and coarse elevation estimate. It then determines the high-resolution estimate of azimuth DOA by combining the information across azimuth and elevation axis.

Figure 5:
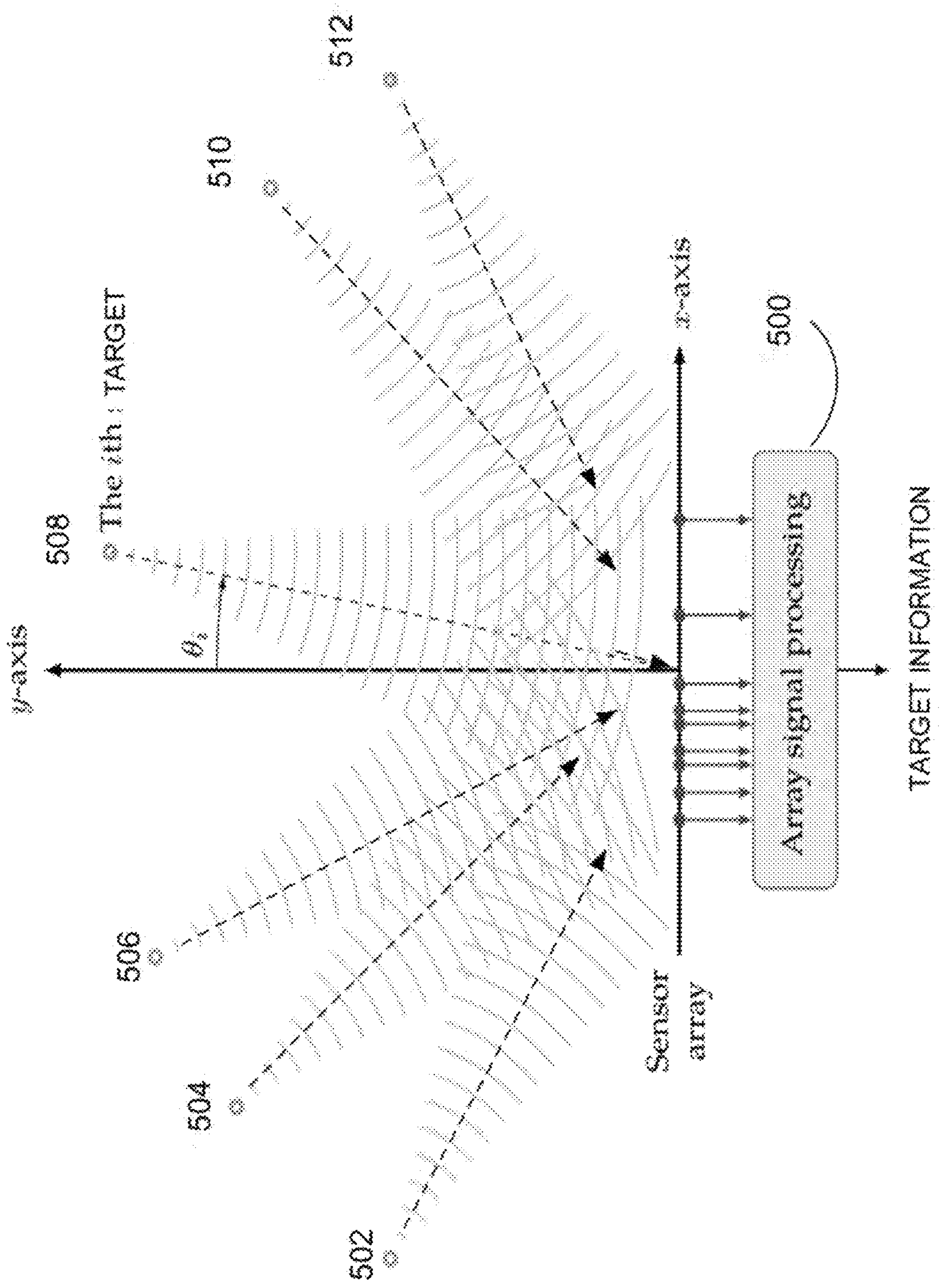
FIG. 5 illustrates a 2D compact hybrid array configuration, according to example embodiments of the present inventions where the phase center between consecutive elements in the azimuth direction is half the wavelength.

FIG. 5 illustrates a view of signals received from a variety of locations, targets. The DOA of each of the echoes from locations 502, 504, 506, 508, 510 and 512 are illustrated with dashed lines. From the DOA, the location in the x-direction is identified and plotted for illustration as individual points. These signals are provided to an array signal processing unit 500 to determine the number of targets and the coarse estimate of corresponding target locations.

Figure 6:
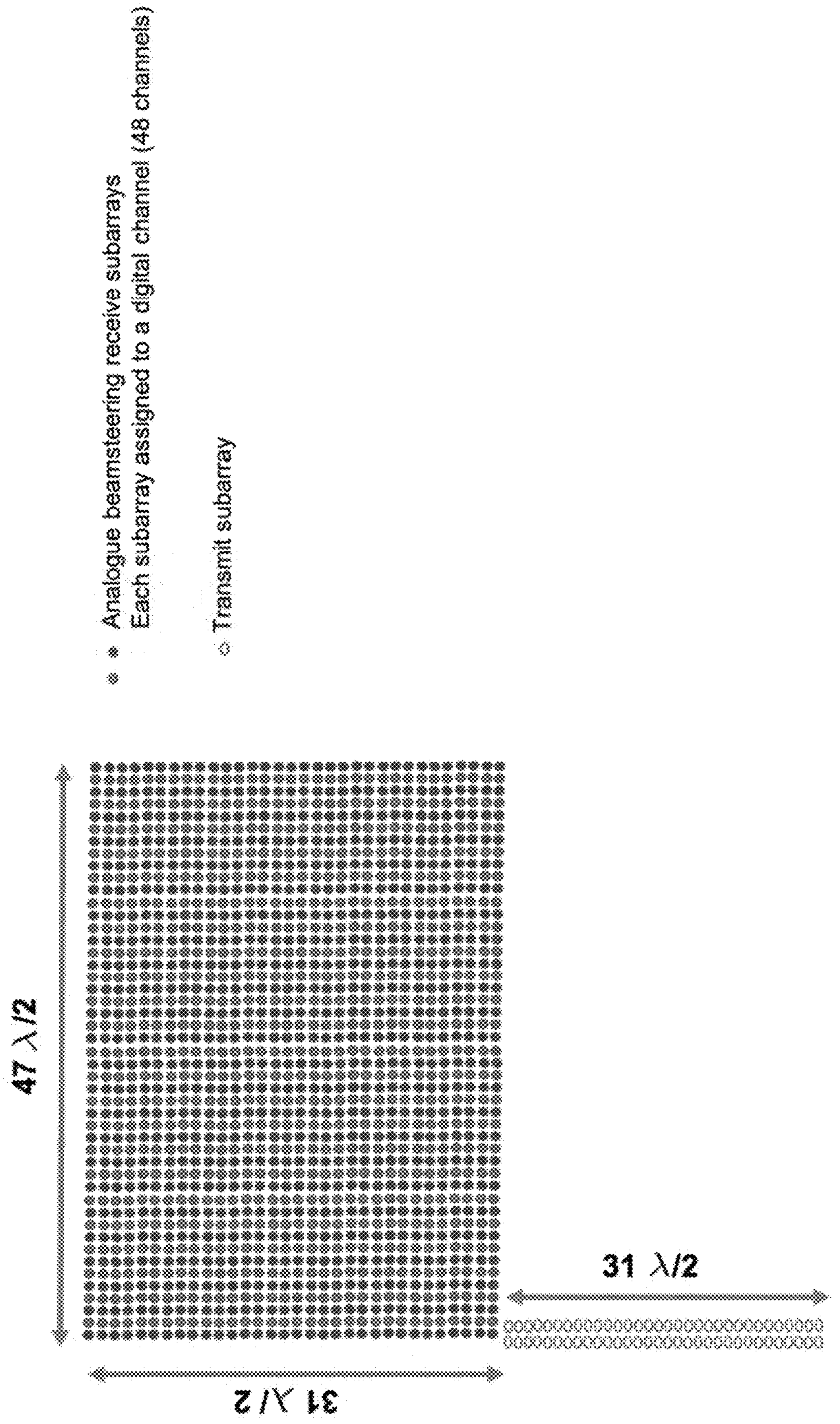
FIG. 6 illustrates a 2D compact hybrid array configuration, according to example embodiments of the present inventions, where the phase center between consecutive elements in the azimuth direction is equal to one wavelength.

FIG. 6 illustrates a hybrid array design implemented by arranging the receiving elements in a compact uniform configuration in both azimuth (horizontal) and elevation (vertical) dimensions. In this context, hybrid configuration implies that elevation localization is being implemented through analogue beamforming/subarray steering (phase shifters). Whereas the azimuth direction of arrival can be implemented through high resolution DOA estimation algorithm as the spatial data is sampled at half the wavelength. Each single column denoted by same color of antenna elements denote a subarray which is served by a single receiver change, whereas each antenna element within a subarray is served by a phase shifter. There are 48 such subarrays, each separated by half the wavelength in azimuth.

Each array of receiving elements is designed to achieve application specifications and may take a variety of forms. This hybrid configuration is advantageous to increase radar range by implementing transmit and receive beamforming in the elevation direction and maintain a sufficiently high frame rate. To achieve this a fan beam is generated at the transmitter which is broader in the azimuth direction and narrower in elevation direction to enable hybrid beamforming achieving high-resolution DOA estimation particularly in the azimuth direction.

Figure 7:
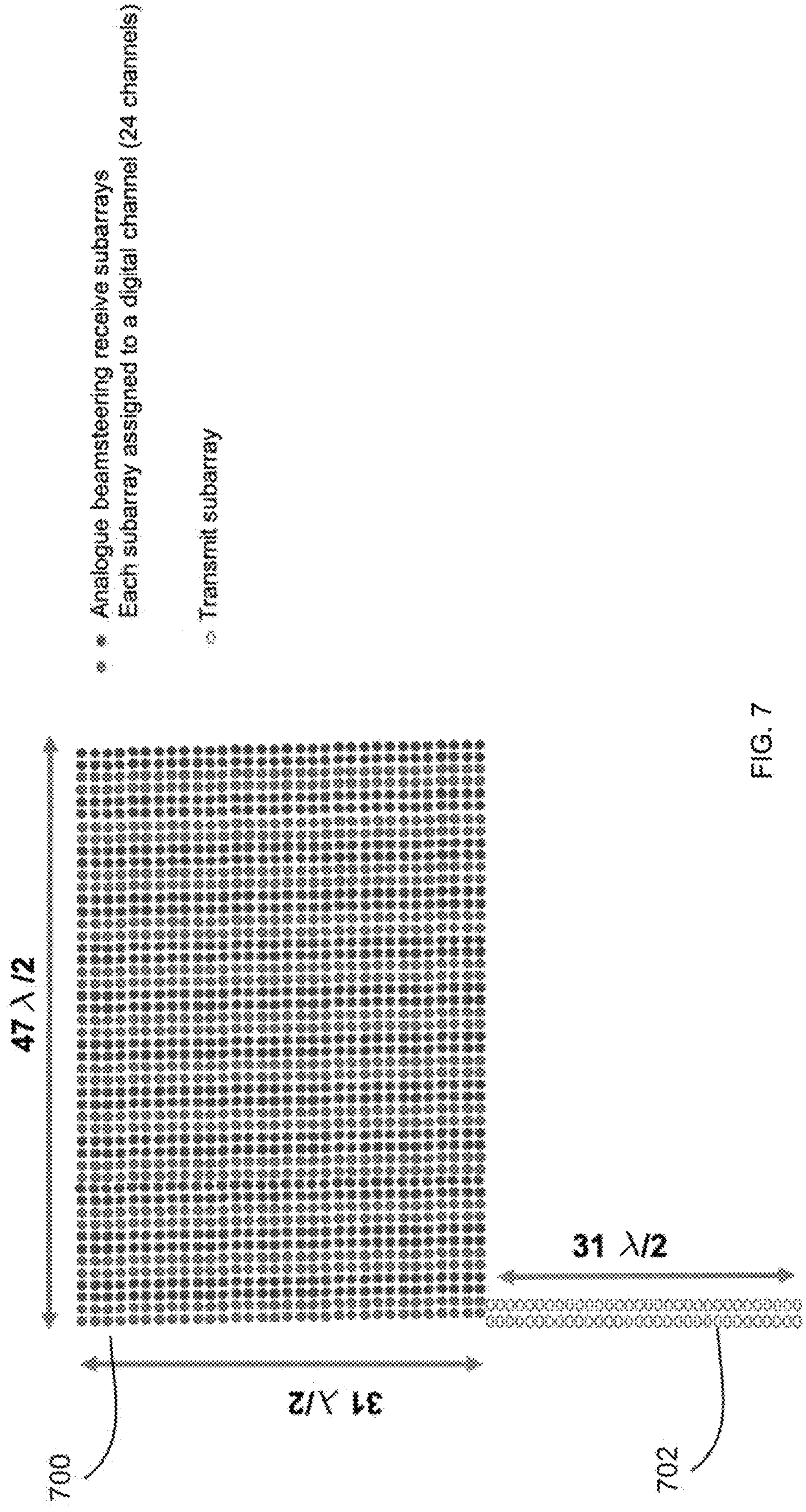
FIG. 7 illustrates a 2D compact hybrid array configuration, according to example embodiments of the present inventions, wherein the 2D array is split into two sections in the elevation direction, namely the upper and lower section and the phase center between consecutive elements in the azimuth direction is equal to one wavelength in each section.

FIG. 7 illustrates a hybrid compact array of receiving elements arranged in a two-dimensional uniformly distributed configuration. Unlike the configuration depicted in FIG. 6, the distance between phase centers of adjacent subarrays in FIG. 7 is equal to a wavelength of operating frequency. This configuration utilizes half the receiver chains but can result in grating lobes as the sampling distance in the azimuth direction is twice that of the minimum distance required to avoid spatial aliasing.

Figure 8:
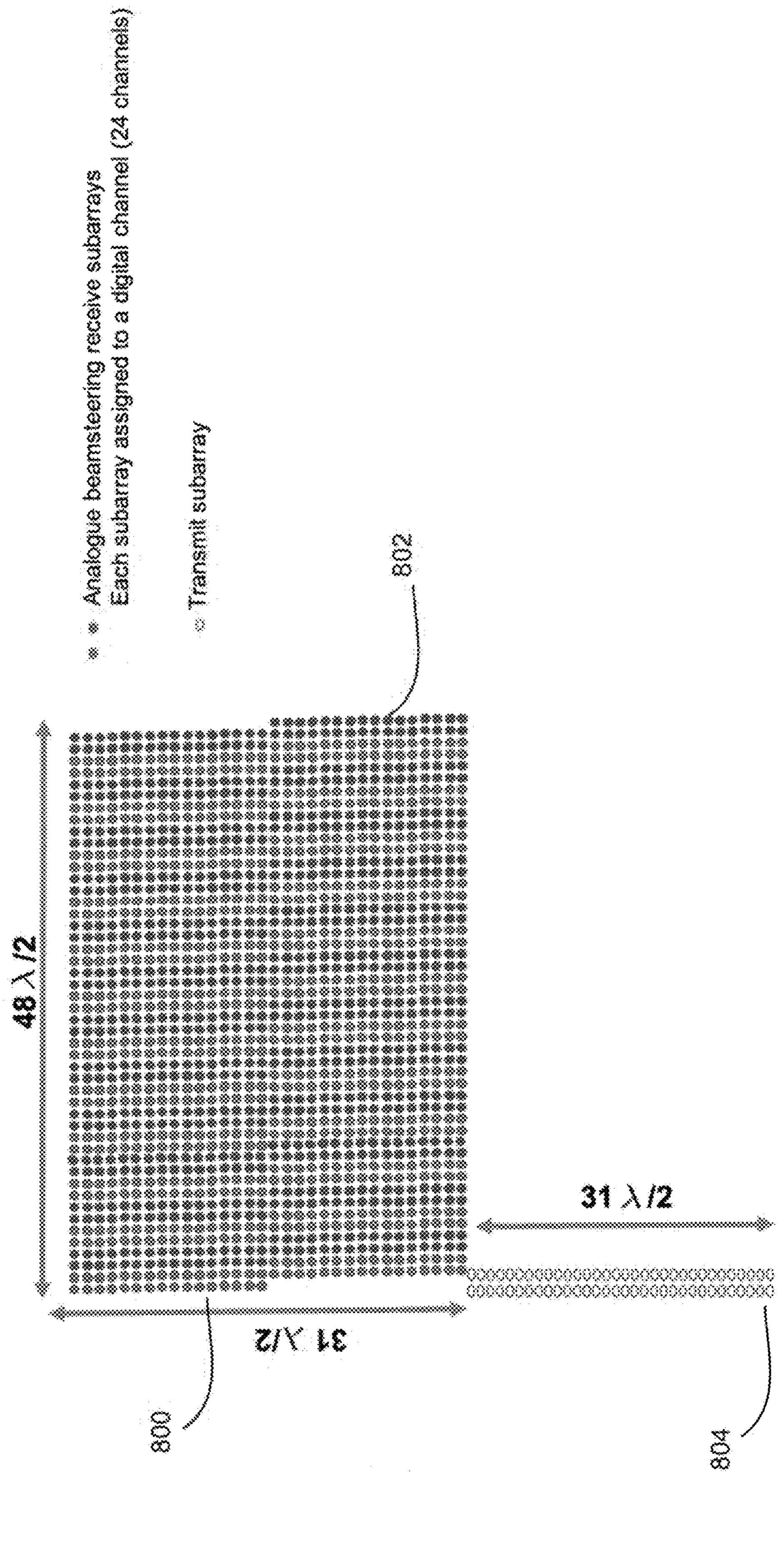
FIG. 8 illustrates a 2D hybrid array configuration with 16*2 subarrays (elevation*azimuth) and the associated array pattern according to examples of the present invention.

FIG. 8 depicts a hybrid compact 2D array of receiving elements configured through two antenna array blocks namely 800 and 802. Both antenna arrays, 800 and 802, are concatenated in elevation (vertically) with the phase centers that are displaced by half the wavelength. The distance between phase centers in the azimuth direction of adjacent subarrays in 800 is equal to a wavelength of operating frequency. Likewise, the phase centers are wavelength apart in 802. It is clear that the data sampled in azimuth direction maintains the minimum sampling distance of half the wavelength, when 800 and 802 data is jointly processed. However, it is noted that the jointly received data is coupled in both elevation and azimuth direction.

Figure 9:
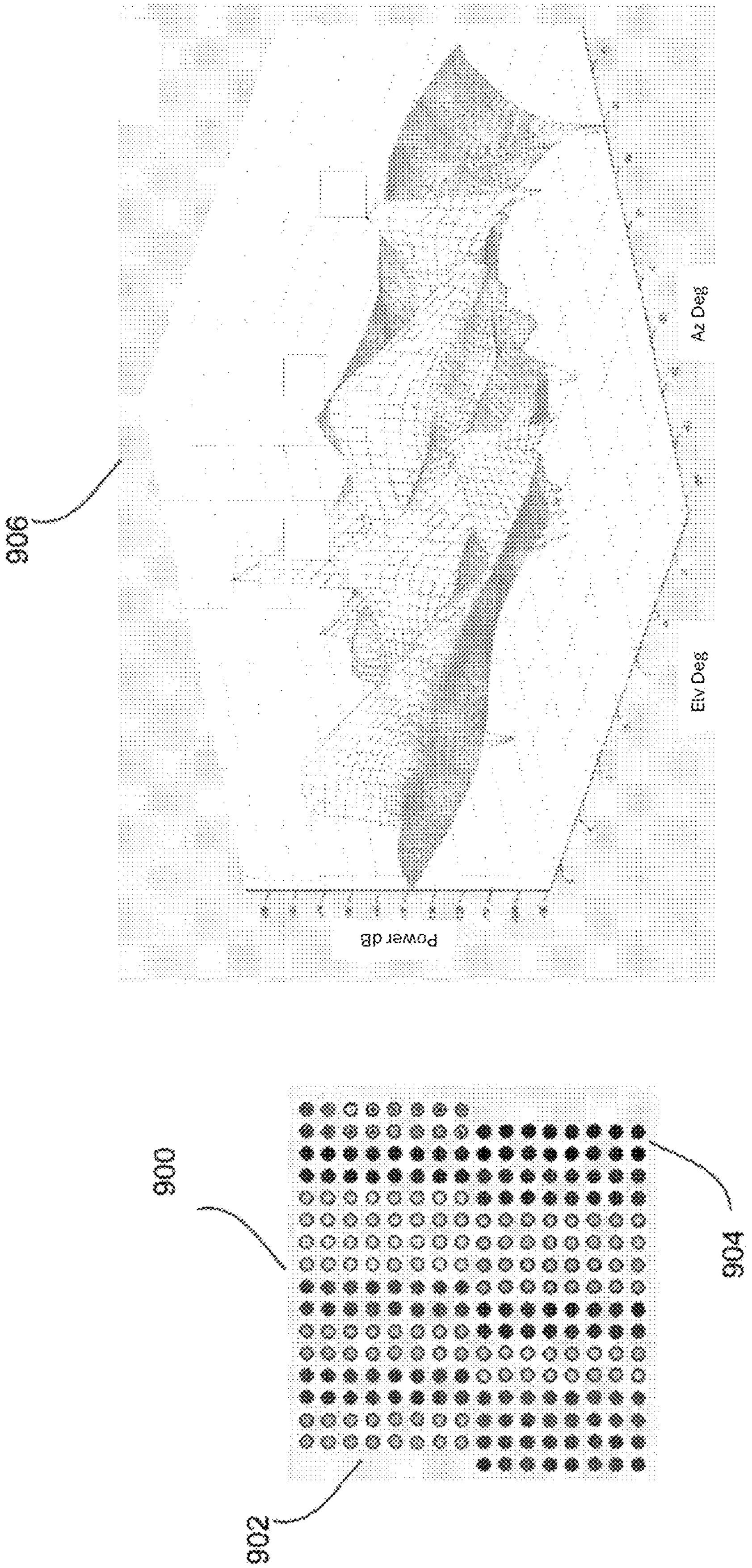
FIG. 9 illustrates a 2D hybrid array configuration with 8*2 subarrays (elevation*azimuth) and the associated array pattern according to examples of the present invention.
Figure 10:
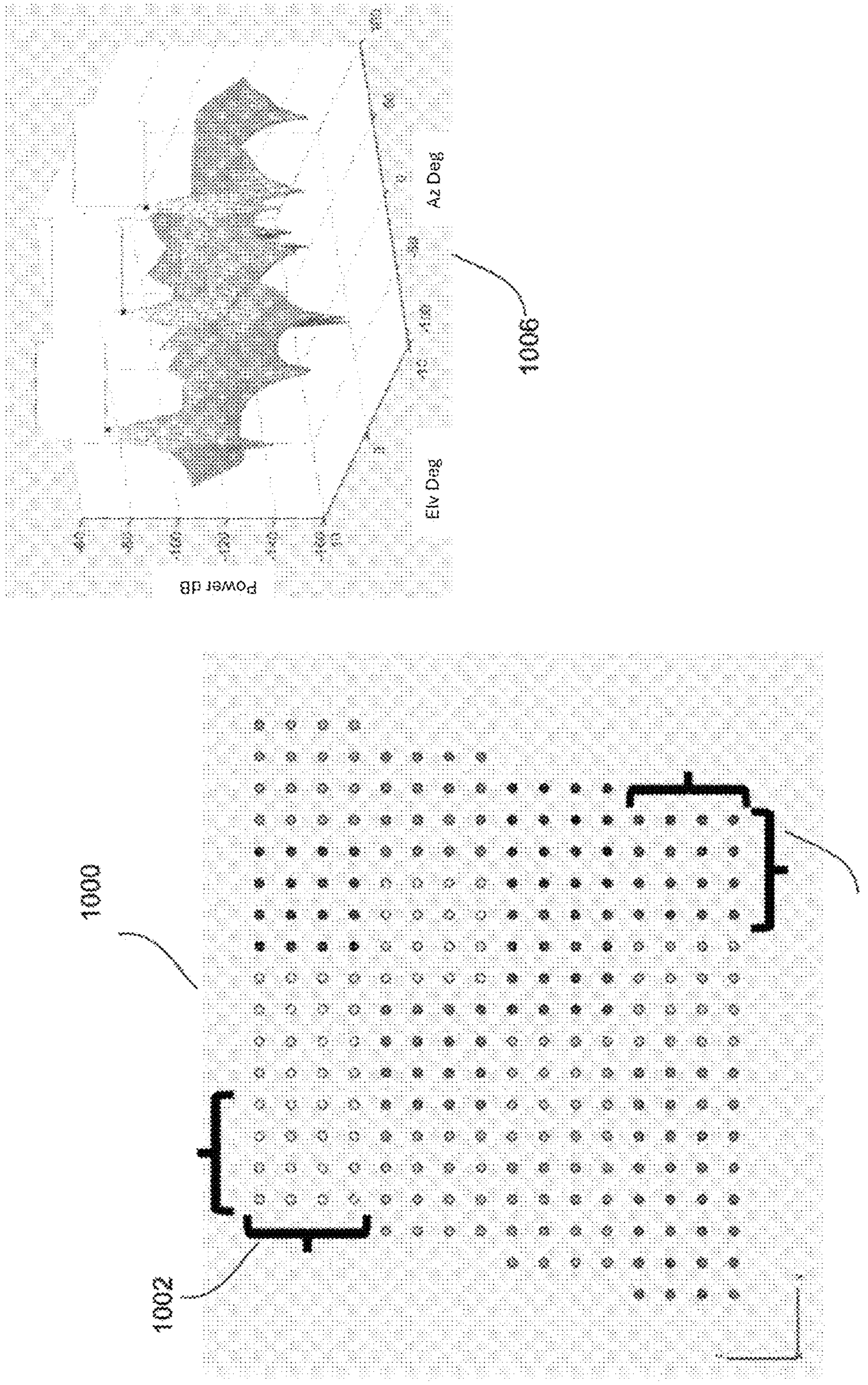
FIG. 10 illustrates a 2D hybrid array configuration with 4*4 subarrays (elevation*azimuth) and the associated array pattern according to examples of the present invention.

FIGS. 9 and 10 depict hybrid compact 2D array configurations consisting of 8*2 and 4*4 subarrays as shown in 900 and 1000 respectively. The corresponding array response of configurations in 900 and 1000 are depicted in 906 and 1006 respectively. Two targets are simulated in 906 at azimuth/elevation angles of 10/2 deg and −30/0 deg. The array response gives additional peaks due to quantization lobes. Nominally quantization lobes are expected at +/−7 deg, however, for the target at −30/0 deg, the lobes appear at around +−7 deg whereas, for 10/2 deg lobe is at 5.5 deg. Maximum Tx beamwidth is around 3.2 deg from elevation center. Maintaining a track of targets in the field of view can be helpful to avoid falsely associating a target to the peak of the quantization lobe. Similar, results are depicted by 1006, where a single target is simulated in the field of view.

Figure 11:
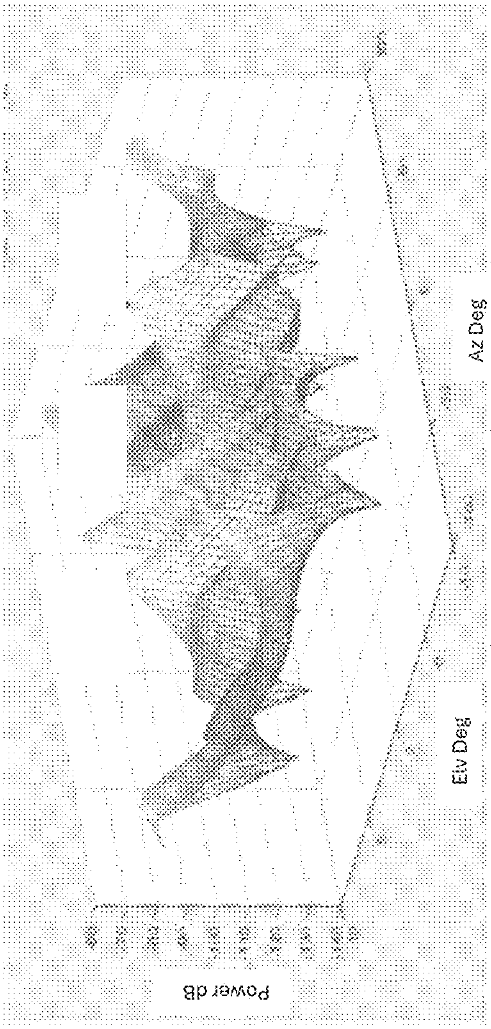
FIG. 11 illustrates a 2D hybrid array configuration with 8*1 subarrays (elevation*azimuth) and the associated array pattern according to examples of the present invention.
Figure 11:
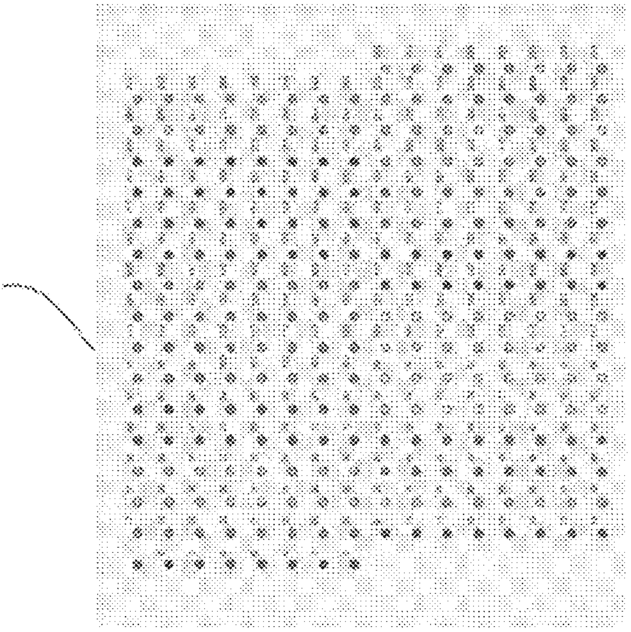

FIG. 11 depict hybrid compact 2D array configurations consisting of 4 (8×1) subarrays and 14 (8×2) subarrays staggered by half lambda relative to elevation. The corresponding array response of configurations in 900 and 1000 are depicted in 906 and 1006 respectively. Two targets are simulated in 1106 at azimuth/elevation angles of 0/−20 deg and −0/0 deg. The array response gives additional peaks due to quantization lobes. Adding $$\frac{\lambda}{2}$$

spacing for a few subarrays in azimuth doesn't help with elevation aliasing due to subarrays.

The present inventions provide methods to improve and extend operation of a receive and transmit antenna array with reduced elements for two-dimensional DOA estimation.

Figure 12:
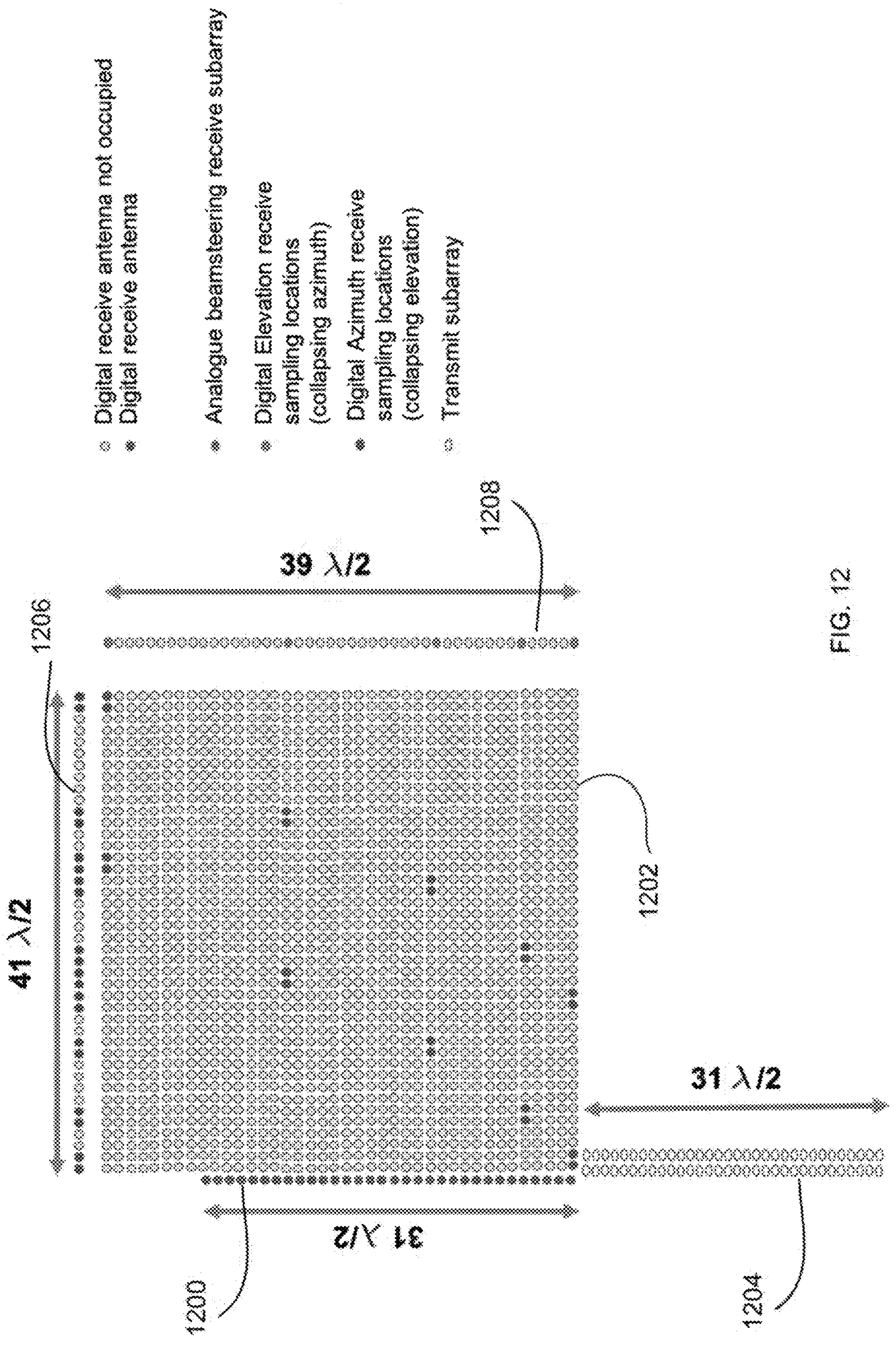
FIG. 12 illustrates a 2D hybrid array configuration with a single 32*1 receive subarray (elevation*azimuth) alongside 20 digital receive channels represented by dark gray dots which are sparsely spread on a 2D grid denoted by light gray dots according to examples of the present invention.

In FIG. 12, a novel radar processing framework is proposed that achieves high resolution 2D angular resolution by adopting a two-step implementation approach. First step involves a coarse estimate of arrival angle in the elevation direction. The second step yields a high-resolution azimuth estimate while also improving on the elevation estimate from the first step. This two-step approach is successful in yielding a high resolution 2D estimate.

For the first step, the received data is processed such that analogue beamsteering is implemented in the elevation DOA. This is implemented by array 1200 which has 32 subarray elements and is served by a single transceiver channel. The data is received such that the elevation subarray steering is implemented using phase shifters. The receive elevation beam follows the transmit elevation beam generated by a (32*2) element transmit subarray 1204. For a given elevation look direction, the data is received over a coherent processing interval (CPI) and accordingly the targets are isolated in the range, doppler and elevation angle. Since, subarray steering is applied to isolate targets in elevation, target resolution is limited as high-resolution DOA estimation techniques can't be applied largely due to the lack of data from each individual sensor along the elevation axis.

The step 2 of the processing deals with finding the azimuth direction of the targets and improving the resolution of the targets in the elevation direction as yielded by the first step. This is implemented by sensor locations 1202, where the dark gray dots represent the sensor locations selected for receiving the data and light gray dots show all the possible sensor locations. It is noted that the selected sensor location lies in a 2D plane and unlike step 1, each sensor location is served by its own receive channel 1206 denotes all the sensor locations sampled in the azimuth direction after collapsing the elevation dimension. 1208 denotes all the sensor locations sampled in the elevation direction after collapsing the azimuth dimension. It is noted that the data is sampled sparsely in both dimensions. However, there are more unique sampling locations in the azimuth direction as compared to the elevation direction. Also, the minimum spacing in the azimuth direction is kept at half the wavelength whereas the minimum spacing is greater in the elevation direction. This is chosen because the targets are already isolated in the elevation direction by step 1, therefore the task of step 2 is only to resolve targets within the FOV of transmit and receive beams which is considerably narrower as compared to the azimuth beam. That is why minimum spacing of half the wavelength is maintained in the azimuth direction which has to resolve targets in the wider field of view and thus would avoid angle ambiguities. The digital sampling locations in this case are 20 which are represented by dark gray dots and the total array aperture in azimuth and elevation is similar. It is noted that in total 21 receive channels are engaged, 20 channels to implement step 2 and a single channel to implement step 1. This configuration can achieve a resolution of 1 deg in both azimuth and elevation directions.

As the aforementioned process involves processing the elevation and azimuth angles in two steps, it is also important to realize that the processing involved in step 2 not only refines the elevation resolution but is also required to pair the right elevation and azimuth angles for a given target. The configuration in FIG. 12 is an example detailed throughout this specification for clarity of understanding; however, there are a variety of configurations that may be implemented. This radar framework can substantially reduce the hardware requirements as compared to the design depicted in FIG. 6. The design depicted in FIG. 6 involves 48 receive channels and achieves a high-resolution DOA estimation across azimuth direction. However, the DOA resolution in the elevation dimension is compromised severely as this design relies solely on subarray steering in the elevation direction. Also, the number of sensor locations and phase shifters in this case is (48*32=1536) which are drastically more than the proposed framework which only employs (32+20=52) antenna elements.

Figure 13:
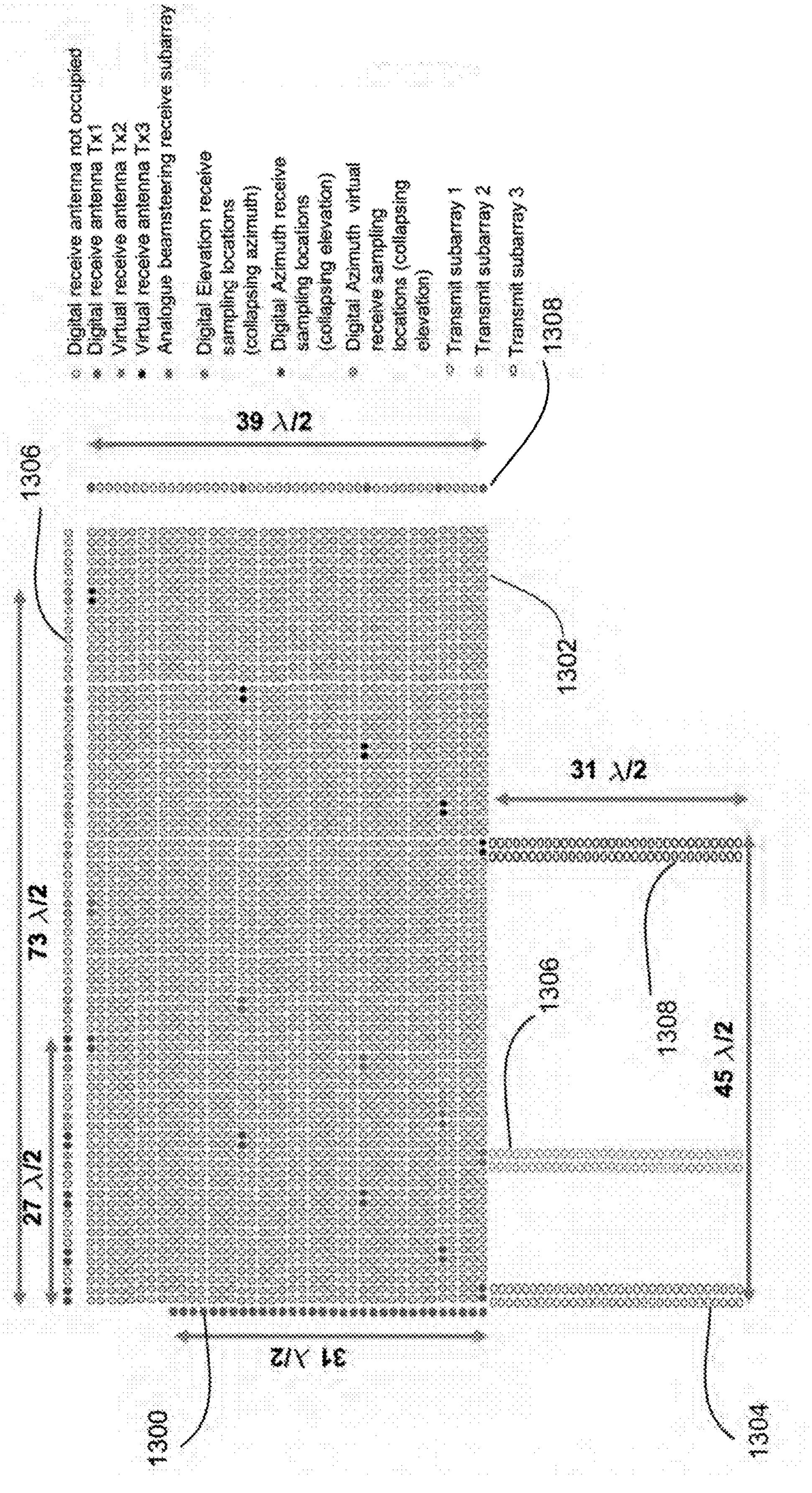
FIG. 13 illustrates a 2D hybrid array MIMO configuration with a single 32*1 receive subarray (elevation*azimuth) alongside 10 physical digital receive channels and 20 virtual receive channels, wherein the 10 physical channels are represented by dark gray dots and virtual receive channels are represented by medium gray dots all sparsely spread on a 2D grid denoted by light gray dots according to examples of the present invention.

FIG. 13 shows the implementation of the proposed framework exploiting MIMO virtual array processing. Three transmit subarrays are employed. The blue dot shows the 10 physical antenna locations, whereas pink and black dots show virtual antenna locations stemming from transmitter 2 and 3 respectively. 1306 shows the unique sampling locations in the azimuth direction after collapsing the elevation axis. Similarly, 1208 depicts the unique sampling locations in the elevation direction collapsing the azimuth axis. It is noted that the physical array aperture in the azimuth direction is 27 times of half the wavelength, whereas the virtual array aperture is considerably bigger and is 73 times of half the wavelength. Also, the azimuth direction is sampled more frequently as compared to the elevation direction as the targets are only possible in the narrower FOV in the elevation direction. The MIMO approach utilizes 11 receive channels and three transmit subarrays and can achieve superior performance as compared to the aforementioned design which utilizes only one transmit subarray and 21 digital channels. The length of the transmit and receive subarrays are carefully chosen to provide a tradeoff between the frame rate and computational complexity. Considerably longer transmit/receive arrays in the elevation direction can improve the elevation resolution of the first step and reduce the dictionary size for second step, however the overall scan rate would be increased for scanning the elevation FOV using a narrower beam. Therefore, the proposed framework also provides a novel means of improving the elevation estimate without using a significantly narrow probing beam.

Figure 14:
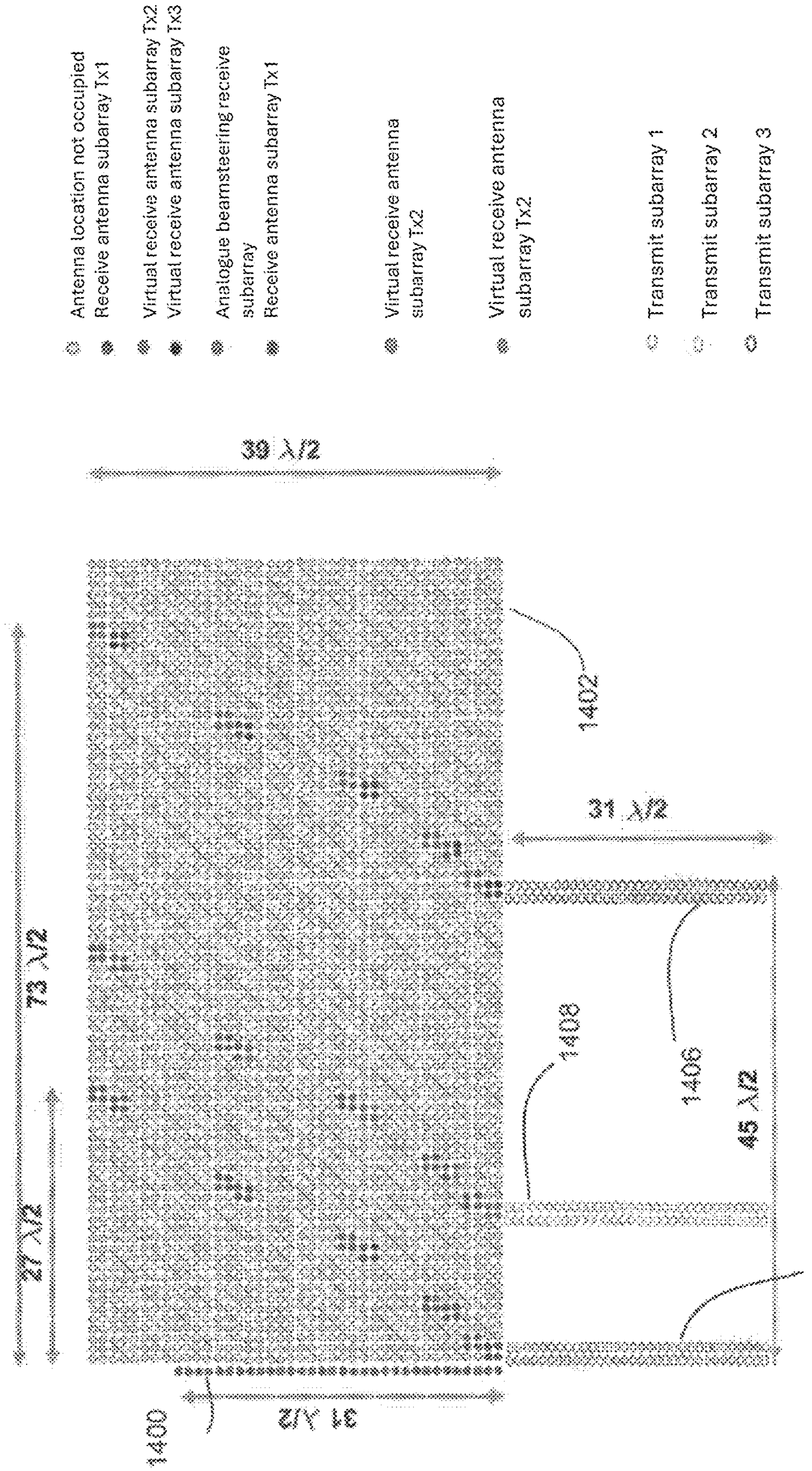
FIG. 14 illustrates a 2D hybrid array MIMO configuration with a single 32*1 receive subarray (elevation*azimuth) alongside 10 (2*2) physical digital receive channels and 20 (2*2) virtual receive channels, where the 10 physical channels are represented by dark gray dots and virtual receive channels are represented by medium gray dots all sparsely spread on a 2D grid denoted by light gray dots according to examples of the present invention.

FIG. 14 shows the implementation of the 2*2 subarrays along with the aforementioned framework exploiting MIMO virtual array processing shown in FIG. 13. The proposed can potentially yield additional processing gain and improve received signal SNR.

Figure 15:
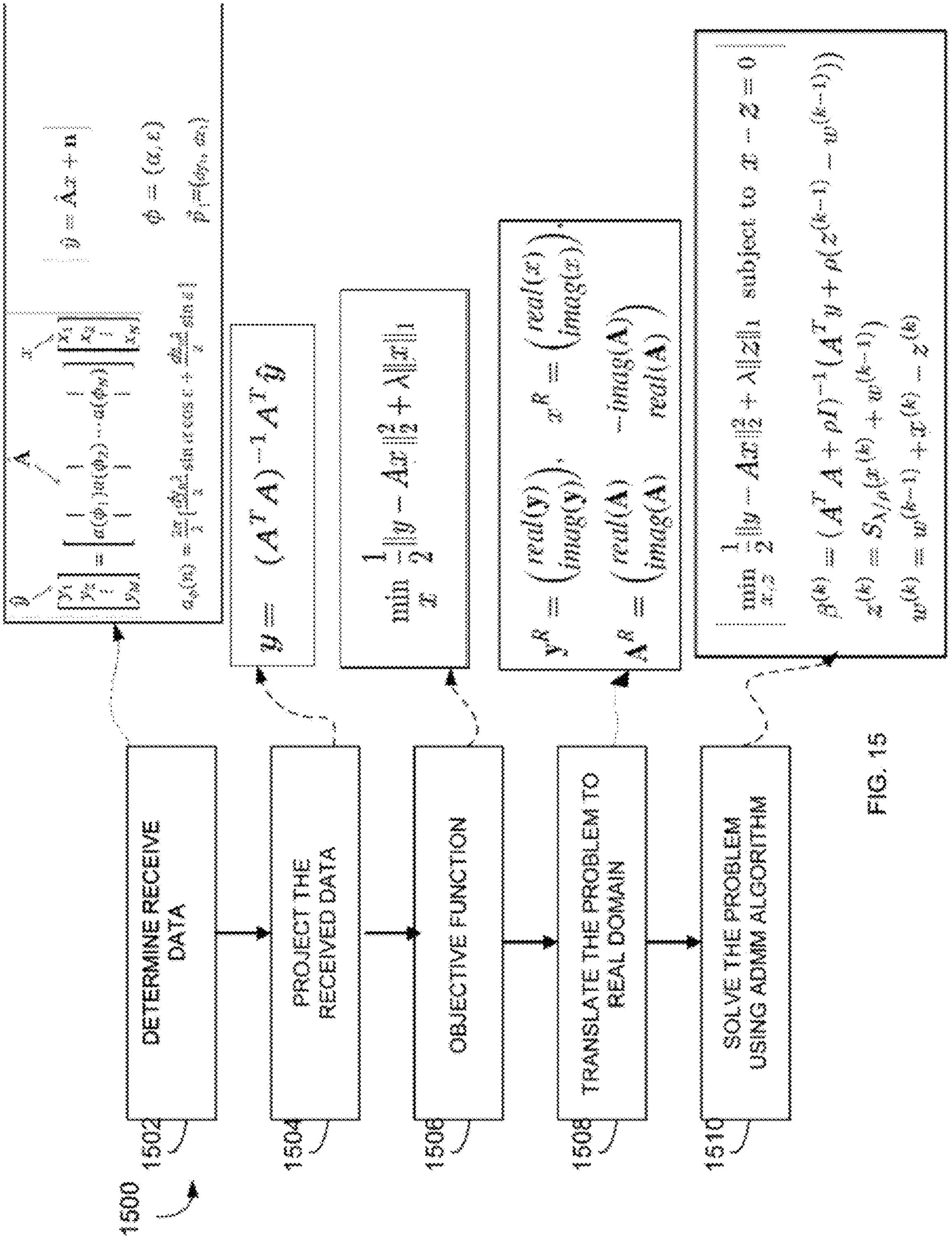
FIG. 15 illustrates a compressive sensing-based algorithm for 2D DOA estimation, according to embodiments of the present invention.

In FIG. 15, a block diagram is presented outlying a novel radar processing framework. The system achieves high resolution 2D angular resolution by adopting a two-step implementation approach. First step involves a coarse estimate of arrival angle in the elevation direction obtained by implementing subarray steering in the transmit beam direction. The second step yields a high-resolution azimuth estimate while also improving on the elevation estimate from the first step. For the first step, the received data is processed such that analogue beamsteering is implemented in the elevation direction. The potential targets are, therefore, first isolated in the elevation, range and doppler, therefore only a few targets are required to be resolved in the azimuth direction, namely those which occupy the same range doppler bin. The step 2 of the processing deals with finding the azimuth direction of the targets and also improving the resolution of the targets in the elevation direction as yielded by the first step.

The received data from the 2D receive array is processed as described in FIG. 15. The process 1500 receives data, 1502, wherein the data is a complex valued. The data is assumed to be generated by a linear combination of only a few elements in matrix $\hat{A}$ which is called a dictionary matrix. This matrix contains all the possible 2D steering vectors of the targets in the region of interest. The region of interest is determined by generating all prospective azimuth and elevation pairs within the field of the radar. This helps to appropriately pair the elevation and azimuth angles of the targets. The process 1504 then projects the receive data to the signal subspace of matrix A. The matrix A is obtained by selecting a few columns of $\hat{A}$, the projection step can help to reduce the computational burden as it significantly reduces the dictionary size by narrowing the region of interest. In this regard, the proposed scheme only zoom-in to the region where the targets are initially allocated. The proposed approach allows for parallel processing, as $\hat{A}$ is partitioned into non overlapping matrices, each representing a spatial sector of interest. Multiple sectors of interest are independently processed, and targets are resolved in each sector of interest. The processing step 1506 fits the received to the assumed model considering only a few sources are present at a given range doppler bin. The proposed objective function is solved by convex optimization approach. This is achieved by first transforming the problem to real variables as depicted in 1508 and consequently the problem, 1508 is solved by ADMM (Alternating direction method of multipliers) algorithm yield a high-resolution estimate of target elevation and azimuth DOA. As the aforementioned algorithm involves processing the elevation and azimuth angles jointly, it is also important to realize that the processing involved in step 2 not only refines the elevation resolution but is also required to pair the right elevation and azimuth angles for a given target. This two step approach is successful in yielding a high resolution 2D estimate.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A method for designing a receive array for a radar system, comprising:

determining a format of receive data;

adopting a two-step approach of analogue and digital beamforming to find a high resolution estimate of target location in both azimuth and elevation angle, wherein the two-step approach comprises: (1) processing received data from a sparse antenna array to determine a first estimate of an angle of arrival in elevation, and (2) processing the received data to determine an azimuth direction of a target and modifying the first estimate using the azimuth direction, thereby refining resolution of elevation to pair the elevation and azimuth angles for a given target;

finding the azimuth direction for a plurality of targets;

improving resolution of elevation estimates of the angle of arrival for each of the plurality of targets; and applying analog beamsteering to determine a direction of arrival in elevation of a received signal to the receive array, wherein applying the analog beamsteering comprises phase shifting the received signal, wherein the receive array has a plurality of columns corresponding to a transmit array for the radar system.

* * * * *